United States Patent
Tian et al.

(10) Patent No.: US 8,218,975 B2
(45) Date of Patent: Jul. 10, 2012

(54) FREE-SPACE DQPSK DEMODULATOR

(75) Inventors: Cechan Tian, Plano, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 12/650,663

(22) Filed: Dec. 31, 2009

(65) Prior Publication Data

US 2011/0044698 A1   Feb. 24, 2011

Related U.S. Application Data

(63) Continuation of application No. 11/479,920, filed on Jun. 30, 2006, now Pat. No. 7,668,466.

(51) Int. Cl.
*H04B 10/06* (2006.01)

(52) U.S. Cl. ........ 398/202; 398/208; 398/212; 398/213; 398/188; 398/161; 359/325; 359/578; 359/618; 356/477; 356/450; 385/14; 385/1

(58) Field of Classification Search .................. 398/183, 398/188, 202, 212, 208, 209, 158, 159, 213, 398/214, 161, 102, 118, 119, 211, 206, 207, 398/204, 205, 201, 140, 141, 135, 136, 128, 398/130; 359/325, 279, 238, 247, 261, 578, 359/618, 629, 633, 577, 583; 356/477, 450, 356/460, 484; 385/14, 1, 11, 15, 27, 140
See application file for complete search history.

(56) References Cited

U.S. PATENT DOCUMENTS

| | | | |
|---|---|---|---|
| 6,626,589 B1 | 9/2003 | Epworth | 398/54 |
| 7,343,104 B2 | 3/2008 | Doerr et al. | 398/212 |
| 7,526,210 B2 | 4/2009 | Liu | 398/188 |
| 7,668,466 B2 * | 2/2010 | Tian et al. | 398/202 |
| 7,792,436 B2 * | 9/2010 | Hoshida et al. | 398/212 |
| 2006/0056845 A1 | 3/2006 | Parsons et al. | 398/41 |
| 2006/0222377 A1 | 10/2006 | Hoshida et al. | 398/212 |

OTHER PUBLICATIONS

Jay (Y.C.) Hsieh, et al., "*Athermal Demodulator for 42.7-Gb/s DPSK Signals*", www.optoplex.com/pdf/ecoc05_a_odi_final.pdf, 2 pages, 2005.
C. R. Doerr, et al., PDP12, "*Simultaneous reception of both quadratures of 40-Gb/s DQSK using a simple monolithic demodulato*", © 2005 Optical Society of America, 3 pages, 2005.

\* cited by examiner

*Primary Examiner* — Hanh Phan
(74) *Attorney, Agent, or Firm* — Baker Botts L.L.P.

(57) ABSTRACT

A demodulator comprises an input splitter, optical device sets, and couplers. The input splitter splits an input signal comprising symbols to yield a number of signals. A first optical device set directs a signal of along a first path. A second optical device set directs another signal along a second path to yield a delayed signal. At least a portion of the second path is in free space. A path length difference between the first path and the second path introduces a delay between the first signal and the second signal. A coupler receives a portion of the signal and a portion of the delayed signal to generate interference, where the interference indicates a phase shift between a phase corresponding to a symbol and a successive phase corresponding to a successive symbol.

19 Claims, 1 Drawing Sheet

US 8,218,975 B2

FREE-SPACE DQPSK DEMODULATOR

CROSS-REFERENCE TO RELATED APPLICATION

This application is a continuation of U.S. patent application Ser. No. 11/479,920 filed Jun. 30, 2006 now U.S. Pat. No. 7,668,466 and entitled "Free Space Demodulator for Demodulating a Signal".

TECHNICAL FIELD

This invention relates generally to the field of signal communication and more specifically to free space demodulator for demodulating a signal.

BACKGROUND

Signals may be modulated according to a differential phase-shifted keying (DPSK) digital modulation technique. According to the technique, changes in phase are used to represent bit data. A modulator at a transmitter translates an input bit sequence into phase changes that represent the input bit sequence. A demodulator at a receiver translates the phase changes to retrieve the input bit sequence.

Known techniques for demodulating a signal, however, are not satisfactory in certain situations. Accordingly, these known techniques are not satisfactory in certain situations.

SUMMARY OF THE DISCLOSURE

In accordance with the present invention, disadvantages and problems associated with previous techniques for demodulating differential phase-shifted keying signals may be reduced or eliminated.

According to one embodiment of the present invention, a demodulator comprises an input splitter, optical device sets, and couplers. The input splitter splits an input signal comprising symbols to yield a number of signals. A first optical device set directs a signal of along a first path. A second optical device set directs another signal along a second path to yield a delayed signal. At least a portion of the second path is in free space. A path length difference between the first path and the second path introduces a delay between the first signal and the second signal. A coupler receives a portion of the signal and a portion of the delayed signal to generate interference, where the interference indicates a phase shift between a phase corresponding to a symbol and a successive phase corresponding to a successive symbol.

Certain embodiments of the invention may provide one or more technical advantages. A technical advantage of one embodiment may be that a demodulator may have an optical signal path, where at least a portion of the path is in free space. Allowing an optical signal to travel in free space may reduce the problems associated with signal communication through solids. For example, a signal traveling through free space may experience lower insertion loss, lower polarization-dependent loss, and lower polarization-dependent frequency shift.

Another technical advantage of one embodiment may be that a reflector of the modulator may be readily adjusted to change the length of an interference path. The length of the interference path may be changed to improve demodulation.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
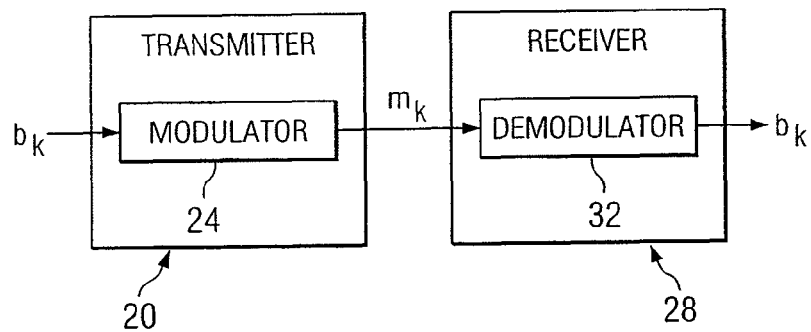
FIG. 1 is a block diagram illustrating one embodiment of a system for communicating a signal according to a differential phase-shifted keying (DPSK) modulation technique.
Figure 2:
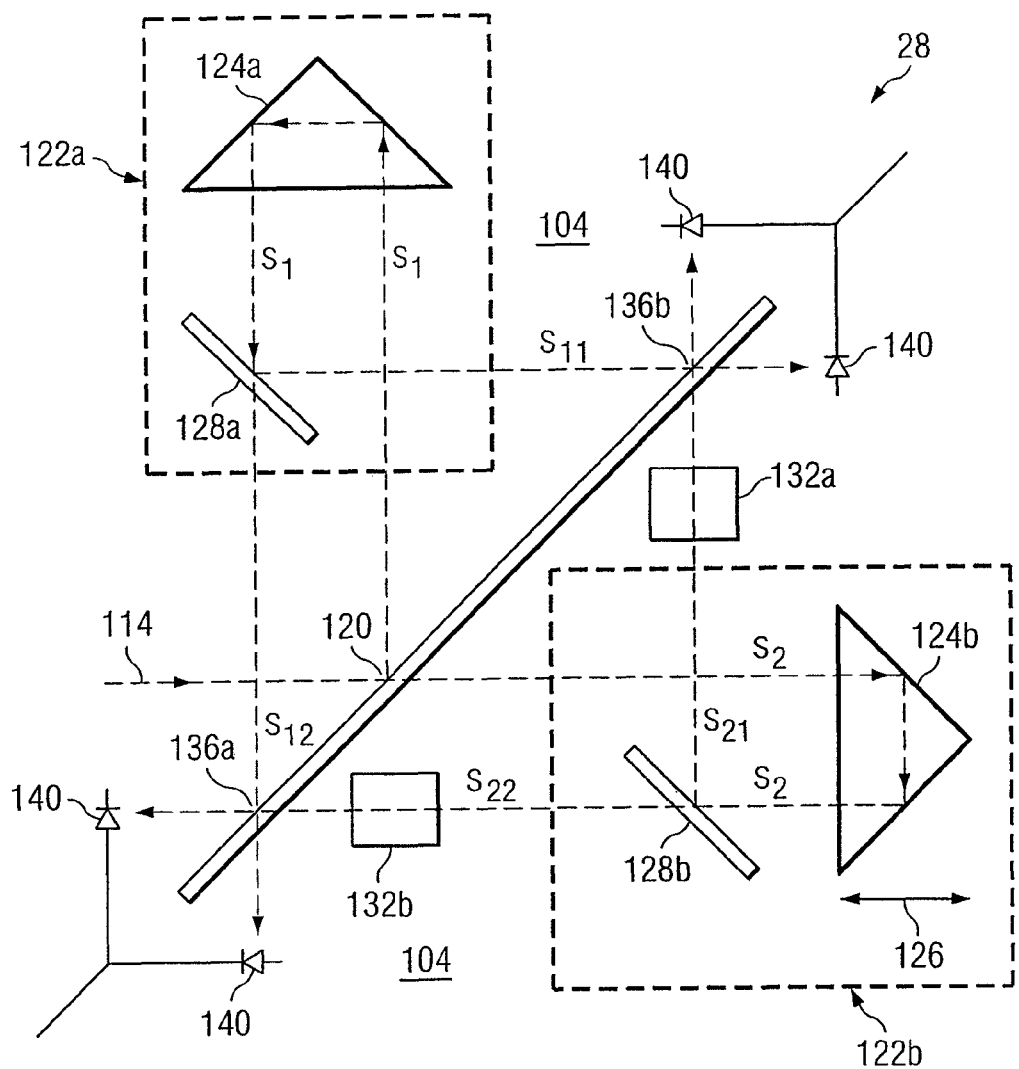
FIG. 2 is a block diagram illustrating one example of a demodulator that demodulates a signal in free space.

Embodiments of the present invention and its advantages are best understood by referring to FIGS. 1 and 2 of the drawings, like numerals being used for like and corresponding parts of the various drawings.

FIG. 1 is a block diagram illustrating one embodiment of a system 10 for communicating a signal according to a differential phase-shifted keying (DPSK) modulation technique. According to the embodiment, system 10 includes a demodulator that has an optical signal path where at least a portion of the path is in free space.

According to the embodiment, system 10 communicates signals. A signal may refer to an optical signal transmitted as light pulses comprising photons. An optical signal may have a frequency of approximately 1550 nanometers, and a data rate of, for example, 10, 20, 40, or over 40 gigabits per second. A signal may communicate information in packets. A packet may comprise a bundle of data organized in a specific way for transmission. A packet may carry any suitable information such as voice, data, audio, video, multimedia, other information, or any combination of the preceding.

System 10 includes components that include any suitable arrangement of elements operable to perform the operations of the component, and may comprise logic, an interface, a memory, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes a transmitter 20 operable to communicate a signal to a receiver 28. Transmitter 20 includes a modulator 24 that encodes the signal according to DPSK modulation. Receiver 28 includes a demodulator 32 that decodes the encoded signal.

According to the embodiment, modulator 24 receives a signal with input bits $b_k$ for time slots k. Modulator 24 encodes bits $b_k$ to yield modulated signal $m_k$. Modulator 24 may comprise any suitable modulator, for example, a Mach- Zehner modulator. Modulator 24 may have a laser that emits a continuous wave light beam, and may modulate the light beam to encodes bits $b_k$.

Bits $b_k$ may be encoded according to DPSK modulation where phase shifts between successive symbols represent bits $b_k$. According to n-phase-shifted keying (n-PSK) modulation, n different levels of phase shifts may be used to encode p bits per symbol, where $n=2^P$. As an example, according to 4-PSK, or differential quadrature phase-shifted keying (DQPSK), four phase differences are used to encode two bits per symbol. In one case, phase shifts 0°, 90°, 180°, and −90° may be used to encode "00", "01", "11", and "10", respectively. As another example, according to 8-PSK, eight phase differences are used to encode three bits per symbol.

Transmitter 20 transmits modulated signal $m_k$ to receiver 28. Demodulator 32 of receiver 28 demodulates signal $m_k$ to reverse the encoding procedure to yield bits $b_k$. To demodulate signal $m_k$, demodulator 32 compares the phase shifts between successive symbols. Demodulator 32 may split signal $m_k$ to yield multiple signals. A signal of the multiple signals may be delayed by one symbol to yield a delayed signal. The delayed signal and a non-delayed signal may be overlapped to compare the phases of successive symbols. The phases may be compared by constructively and destructively interfering the overlapped signals. Demodulator 32 may include photodiodes that detect the interference and generate a detector signal representing the interference.

According to one embodiment, demodulator 32 has an optical signal path, where at least a portion of the path is in free space. Free space may refer to a space where there is no solid material, for example, there is a vacuum, a gas, or a liquid, other non-solid, or any combination of any of the preceding. Accordingly, a signal may be communicated through a vacuum, a gas, or a liquid. An example of demodulator 32 is described in more detail with reference to FIG. 2.

Modifications, additions, or omissions may be made to system 10 without departing from the scope of the invention. The components of system 10 may be integrated or separated according to particular needs. Moreover, the operations of system 10 may be performed by more, fewer, or other devices. Additionally, operations of system 10 may be performed using any suitable logic. As used in this document, "each" refers to each member of a set or each member of a subset of a set.

FIG. 2 is a block diagram illustrating one example of demodulator 32 that demodulates a signal in free space 104. Demodulator 32 may be used with system 10 of FIG. 1.

According to the illustrated embodiment, demodulator includes an input 114, a beam splitter 120, and optical device sets 122 coupled as shown. Optical device sets 122 define paths 144 along which an optical signal travels. Optical device sets 122 may include reflectors 124 and beam splitters 128 coupled as shown. Beam splitter 120, reflector 124a, and beam splitter 128a define a first interference path 144a, and beam splitter 120, reflector 124b, and beam splitter 128b define a second interference path 144b. At least a portion of a path 144 may be in free space 104.

According to the illustrated embodiment, input 114 receives an input signal that has been modulated according to DPSK modulation, such as DQPSK modulation. Input 114 directs the signal towards beam splitter 120. Beam splitter 120 splits the signal into a plurality of signals that are directed towards reflectors 124. For example, beam splitter 120 may split the signal into two approximately equivalent signals $S_1$ and $S_2$ comprising in-phase and quadrature-phase component signals. Signal $S_1$ may be directed towards reflector 124a, and signal $S_2$ may be directed towards reflector 124b.

Reflectors 124 reflect signals $S_1$ and $S_2$ towards beam splitters 128. For example, reflector 124a reflects signal $S_1$ towards beam splitter 128a, and reflector 124b reflects signal $S_2$ towards beam splitter 128. According to one embodiment, a difference in the path lengths of interference paths 144 introduces a relative symbol delay between signals $S_1$ and $S_2$. The difference may be one symbol length, which may be established from the ratio of the group velocity and the symbol rate.

The delay may be adjusted by changing the length of one or more interference paths 144 to yield a difference of one symbol length. For example, the length may be changed by moving reflector 124a relative to beam splitter 128, such as in direction 126. The delay may be adjusted to align the signals for constructive and destructive interference.

Beam splitters 128 split the signals received from reflectors 124. Beam splitter 128a splits signal $S_1$ into signals $S_{11}$ and $S_{12}$, and beam splitter 128b splits signal $S_2$ into signals $S_{21}$ and $S_{22}$. Beam splitters 128 may split signals into two approximately equivalent signals.

Phase delays 132 introduce a phase delay into signals. According to the illustrated embodiment, phase delay 132a introduces a phase delay into signal $S_{21}$, and phase delay 132b introduces a phase delay into signal $S_{22}$. Any suitable phase delays may be introduced, such as phase delays that introduce a phase difference equivalent to the phase differences between phase levels. For example, for DQPSK with a phase difference of $\Pi/2$, phase delay 132a introduces a phase delay of $\Pi/4$, and phase delay 132b introduces a phase delay $\Pi/4$.

Couplers 136 receive signals from beam splitters 128, and split the signals into signals that can be destructively interfered and constructively interfered. According to the illustrated embodiment, coupler 136b combines signals $S_{11}$ and $S_{21}$, and coupler 136a combines signals $S_{12}$ and $S_{22}$. According to one embodiment, a beam splitter may comprise beam splitters 120 and couplers 136. Photodiodes 140 may detect constructive and destructive interference of signals $S_{11}$ and $S_{21}$, and may detect constructive and destructive interference of signals $S_{11}$ and $S_{21}$.

Modifications, additions, or omissions may be made to demodulator 32 without departing from the scope of the invention. The components of demodulator 32 may be integrated or separated according to particular needs. Moreover, the operations of demodulator 32 may be performed by more, fewer, or other devices. Additionally, operations of demodulator 32 may be performed using any suitable logic.

Certain embodiments of the invention may provide one or more technical advantages. A technical advantage of one embodiment may be that a demodulator may have an optical signal path, where at least a portion of the path is in free space. Allowing an optical signal to travel in free space may reduce the problems associated with signal communication through solids. For example, a signal traveling through free space may experience lower insertion loss, lower polarization-dependent loss, and lower polarization-dependent phase shift.

Another technical advantage of one embodiment may be that a reflector of the modulator may be readily adjusted to change the length of an interference path. The length of the interference path may be changed to improve demodulation.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A demodulator operable to demodulate a signal, comprising:
   an input splitter operable to split an input signal to yield a plurality of signals, the input signal comprising a plurality of symbols;
   a plurality of optical device sets comprising:
      a first optical device set operable to direct a signal of the plurality of signals along a first path; and
      a second optical device set operable to direct another signal of the plurality of signals along a second path to yield a delayed signal, a path length difference between the first path and the second path introducing a delay between the first signal and the second signal, at least a portion of the second path being in free space; and
   a plurality of couplers, a coupler of the plurality of couplers operable to:
      receive a portion of the signal and a portion of the delayed signal to generate interference, the interference indicating a phase shift between a phase corresponding to a symbol of the plurality of symbols and a successive phase corresponding to a successive symbol of the plurality of symbols;
   wherein the input splitter and the plurality of couplers are integrated in a common component.

2. The demodulator of claim 1, wherein the input signal is modulated according to differential quadrature phase-shifted keying modulation.

3. The demodulator of claim 1, wherein the second optical device set further comprises a reflector operable to:
   reflect the other signal of the plurality of signals; and
   move to change the path length difference.

4. The demodulator of claim 1, wherein an optical device set of the plurality of optical device sets further comprises:
   a reflector operable to reflect at least one signal of the plurality of signals to yield a reflected signal; and
   a beam splitter operable to split the reflected signal.

5. The demodulator of claim 1, wherein an optical device set of the plurality of optical device sets further comprises:
   a phase delay operable to delay a phase of at least one signal of the plurality of signals.

6. The demodulator of claim 1, wherein the plurality of couplers further comprises:
   a first coupler operable to receive a first portion of the signal and a first portion of the delayed signal to generate the interference; and
   a second coupler operable to receive a second portion of the signal and a second portion of the delayed signal to generate the interference.

7. The demodulator of claim 1, further comprising a beam splitter comprising:
   the input splitter; and
   the plurality of couplers.

8. The demodulator of claim 1, further comprising a plurality of photodiodes operable to:
   detect the interference; and
   generate a detector signal representing the phase shift.

9. The demodulator of claim 1, further comprising a plurality of photodiodes operable to detect the interference, the plurality of photodiodes further comprising:
   a first photodiode operable to detect destructive interference; and
   a second photodiode operable to detect constructive interference.

10. A method for demodulating a signal, comprising:
    splitting an input signal at an input splitter to yield a plurality of signals, the input signal comprising a plurality of symbols;
    directing a signal of the plurality of signals along a first path using a first optical device set of a plurality of optical device sets;
    directing another signal of the plurality of signals along a second path using a second optical device set to yield a delayed signal, a path length difference between the first path and the second path introducing a delay between the first signal and the second signal, at least a portion of the second path being in free space; and
    receiving a portion of the signal and a portion of the delayed signal at a coupler of the plurality of couplers to generate interference, the interference indicating a phase shift between a phase corresponding to a symbol of the plurality of symbols and a successive phase corresponding to a successive symbol of the plurality of symbols;
    wherein the input splitter and the plurality of couplers are integrated in a common component.

11. The method of claim 10, wherein the input signal is modulated according to differential quadrature phase-shifted keying modulation.

12. The method of claim 10, further comprising:
    reflecting the other signal of the plurality of signals using a reflector of the second optical device set; and
    moving the reflector to change the path length difference.

13. The method of claim 10, further comprising:
    reflecting at least one signal of the plurality of signals using a reflector of an optical device set of the plurality of optical device sets to yield a reflected signal; and
    splitting the reflected signal using a beam splitter of an optical device set of the plurality of optical device sets.

14. The method of claim 10, further comprising:
    delaying a phase of at least one signal of the plurality of signals using a phase delay of an optical device set of the plurality of optical device sets.

15. The method of claim 10, wherein receiving a portion of the signal and a portion of the delayed signal at a coupler of the plurality of couplers to generate interference further comprises:
    receiving a first portion of the signal and a first portion of the delayed signal at a first coupler to generate the interference; and
    receiving a second portion of the signal and a second portion of the delayed signal at a second coupler to generate the interference.

16. The method of claim 10, further comprising a beam splitter comprising:
    the input splitter; and
    the plurality of couplers.

17. The method of claim 10, further comprising:
    detecting the interference; and
    generating a detector signal representing the phase shift.

18. The method of claim 10, further comprising detecting the interference by:
    detecting destructive interference; and
    detecting constructive interference.

19. A demodulator operable to demodulate a signal, comprising:
    an input splitter operable to split an input signal to yield a plurality of signals, the input signal comprising a plurality of symbols, the input signal modulated according to differential quadrature phase-shifted keying modulation;

a plurality of optical device sets comprising:
- a first optical device set operable to direct a signal of the plurality of signals along a first path; and
- a second optical device set operable to direct another signal of the plurality of signals along a second path to yield a delayed signal, a path length difference between the first path and the second path introducing a delay between the first signal and the second signal, at least a portion of the second path being in free space, the second optical device set further comprising a reflector operable to:
  - reflect the other signal of the plurality of signals; and
  - move to change the path length difference; and
- an optical device set of the plurality of optical device sets further comprising:
  - a reflector operable to reflect at least one signal of the plurality of signals to yield a reflected signal;
  - a beam splitter operable to split the reflected signal; and
  - a phase delay operable to delay a phase of at least one signal of the plurality of signals;

a plurality of couplers, a coupler of the plurality of couplers operable to:
  receive a portion of the signal and a portion of the delayed signal to generate interference, the interference indicating a phase shift between a phase corresponding to a symbol of the plurality of symbols and a successive phase corresponding to a successive symbol of the plurality of symbols, the plurality of couplers further comprising:
  - a first coupler operable to receive a first portion of the signal and a first portion of the delayed signal to generate the interference; and
  - a second coupler operable to receive a second portion of the signal and a second portion of the delayed signal to generate the interference; and a plurality of photodiodes operable to:
  detect the interference; and
  generate a detector signal representing the phase shift, the plurality of photodiodes further comprising:
  a first photodiode operable to detect destructive interference; and
  a second photodiode operable to detect constructive interference;

wherein the input splitter and the plurality of couplers are integrated in a common component.

* * * * *